(12) United States Patent
Mukainakano

(10) Patent No.: US 11,541,613 B2
(45) Date of Patent: Jan. 3, 2023

(54) FIBER-REINFORCED RESIN COMPOSITE MATERIAL AND METHOD OF MANUFACTURING FIBER-REINFORCED RESIN COMPOSITE MATERIAL

(71) Applicant: SUBARU CORPORATION, Tokyo (JP)

(72) Inventor: Yuya Mukainakano, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 149 days.

(21) Appl. No.: 17/001,816

(22) Filed: Aug. 25, 2020

(65) Prior Publication Data
US 2021/0094244 A1  Apr. 1, 2021

(30) Foreign Application Priority Data

Sep. 26, 2019 (JP) .............................. JP2019-176139

(51) Int. Cl.
| | | |
|---|---|---|
| *B29C 70/34* | (2006.01) | |
| *B29C 70/06* | (2006.01) | |
| *B32B 5/10* | (2006.01) | |
| *B32B 5/24* | (2006.01) | |
| *B32B 5/26* | (2006.01) | |

(Continued)

(52) U.S. Cl.
CPC ............ *B29C 70/345* (2013.01); *B29C 70/06* (2013.01); *B32B 1/08* (2013.01); *B32B 3/02* (2013.01); *B32B 5/022* (2013.01); *B32B 5/10* (2013.01); *B32B 5/12* (2013.01); *B32B 5/24* (2013.01); *B32B 5/26* (2013.01); *B32B 5/265* (2021.05); *B32B 5/266* (2021.05); *B32B 7/03* (2019.01); *B29K 2101/10* (2013.01); *B29K 2105/08* (2013.01); *B29K 2307/04* (2013.01); *B29L 2031/30* (2013.01); *B32B 2260/00* (2013.01);

(Continued)

(58) Field of Classification Search
CPC ......... B32B 1/08; B32B 5/12; B32B 2260/00; Y10T 428/24752
See application file for complete search history.

(56) References Cited

U.S. PATENT DOCUMENTS

2012/0014804 A1\* 1/2012 Kuroiwa ............... F03D 1/0675
416/241 A

FOREIGN PATENT DOCUMENTS

JP  2005-225364 A1  8/2005

\* cited by examiner

*Primary Examiner* — David Sample
*Assistant Examiner* — Donald M Flores, Jr.
(74) *Attorney, Agent, or Firm* — Troutman Pepper Hamilton Sanders LLP

(57) ABSTRACT

A fiber-reinforced resin composite material has a longitudinal direction, and includes a first stack, a second stack, a ridge, a flat surface, and a connection. The ridge extends in the longitudinal direction. The flat surface is continuous to the ridge. The connection is where the first and second stacks are coupled. The first and second stacks are joined to each other in a direction intersecting the longitudinal direction. Fibers of at least one of first fiber-reinforced resin sheets included in the first stack, fibers of at least one of second fiber-reinforced resin sheets included in the second stack, or both intersect the ridge. The connection includes the first and second fiber-reinforced resin sheets that are overlapped alternately, and includes ends of the first fiber-reinforced resin sheets, ends of the second fiber-reinforced resin sheets, or both that are shifted from each other to allow the connection to have a gradually-varied thickness.

21 Claims, 8 Drawing Sheets

(51) Int. Cl.
*B32B 5/02* (2006.01)
*B32B 5/12* (2006.01)
*B32B 7/03* (2019.01)
*B32B 3/02* (2006.01)
*B32B 1/08* (2006.01)
B29K 307/04 (2006.01)
B29K 105/08 (2006.01)
B29K 101/10 (2006.01)
B29L 31/30 (2006.01)

(52) U.S. Cl.
CPC ....... *B32B 2305/07* (2013.01); *B32B 2305/08* (2013.01)

FIBER-REINFORCED RESIN COMPOSITE MATERIAL AND METHOD OF MANUFACTURING FIBER-REINFORCED RESIN COMPOSITE MATERIAL

CROSS-REFERENCE TO RELATED APPLICATIONS

The present application claims priority from Japanese Patent Application No. 2019-176139 filed on Sep. 26, 2019, the entire contents of which are hereby incorporated by reference.

BACKGROUND

The technology relates to a fiber-reinforced resin composite material that uses a fiber-reinforced resin, and to a method of manufacturing the fiber-reinforced resin composite material.

Manufacturing a structural member of a body of a vehicle, such as a center pillar, with use of a fiber-reinforced resin has been under consideration in recent years for purpose of reducing a weight of the vehicle such as an automobile. The fiber-reinforced resin contains reinforcing fibers such as carbon fibers. A member made of the fiber-reinforced resin is high in rigidity and exhibits high strength for a stress, especially for a tensile stress that acts in a direction in which the fibers are oriented.

One example of application of a fiber-reinforced resin composite material is an automotive shock-absorbing member. The automotive shock-absorbing member includes CFRP (carbon-fiber reinforced plastic) members that have different strength properties from each other and that are provided for respective flat surfaces or curved surfaces structuring the fiber-reinforced resin composite material. A fiber-reinforced resin sheet involves variation in strength property depending on a direction in which continuous fibers are oriented. Accordingly, making different the directions of orientation of the continuous fibers in the fiber-reinforced resin sheets, provided on respective surfaces structuring the fiber-reinforced resin composite material, makes it possible to achieve different strength properties for the respective surfaces. For example, reference is made to Japanese Unexamined Patent Application Publication No. 2005-225364.

SUMMARY

An aspect of the technology provides a fiber-reinforced resin composite material that is for a structure of a body and that has a longitudinal direction. The fiber-reinforced resin composite material includes a first stack, a second stack, a ridge, a flat surface, and a connection. The first stack includes a plurality of first fiber-reinforced resin sheets each having fibers and each having an end. The second stack includes a plurality of second fiber-reinforced resin sheets each having fibers and each having an end. The ridge extends in the longitudinal direction. The flat surface is continuous to the ridge. The connection is provided on the flat surface and where the first stack and the second stack are coupled to each other. The first stack and the second stack are joined to each other in a direction that intersects the longitudinal direction. The fibers of at least one of the first fiber-reinforced resin sheets, the fibers of at least one of the second fiber-reinforced resin sheets, or both intersect the ridge. The connection includes the first fiber-reinforced resin sheets and the second fiber-reinforced resin sheets that are overlapped alternately and includes the ends of the first fiber-reinforced resin sheets, the ends of the second fiber-reinforced resin sheets, or both. The ends of the first fiber-reinforced resin sheets, the ends of the second fiber-reinforced resin sheets, or both are shifted from each other to allow the connection to have a thickness that is gradually varied.

An aspect of the technology provides a method of manufacturing a fiber-reinforced resin composite material that is for a structure of a body and that has a ridge extending in a longitudinal direction. The method includes: preparing a first stack and a second stack, in which the first stack includes a plurality of first fiber-reinforced resin sheets each having an end, and the second stack includes a plurality of second fiber-reinforced resin sheets each having an end; alternately overlapping the first fiber-reinforced resin sheets and the second fiber-reinforced resin sheets on a flat surface that is continuous to the ridge, in which the alternately overlapping the first fiber-reinforced resin sheets and the second fiber-reinforced resin sheets includes shifting the ends of the first fiber-reinforced resin sheets, the ends of the second fiber-reinforced resin sheets, or both to allow a connection at which the first stack and the second stack are coupled to each other to have a thickness that is gradually varied; and curing the first fiber-reinforced resin sheets and the second fiber-reinforced resin sheets to join the first stack and the second stack in a direction that intersects the longitudinal direction.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
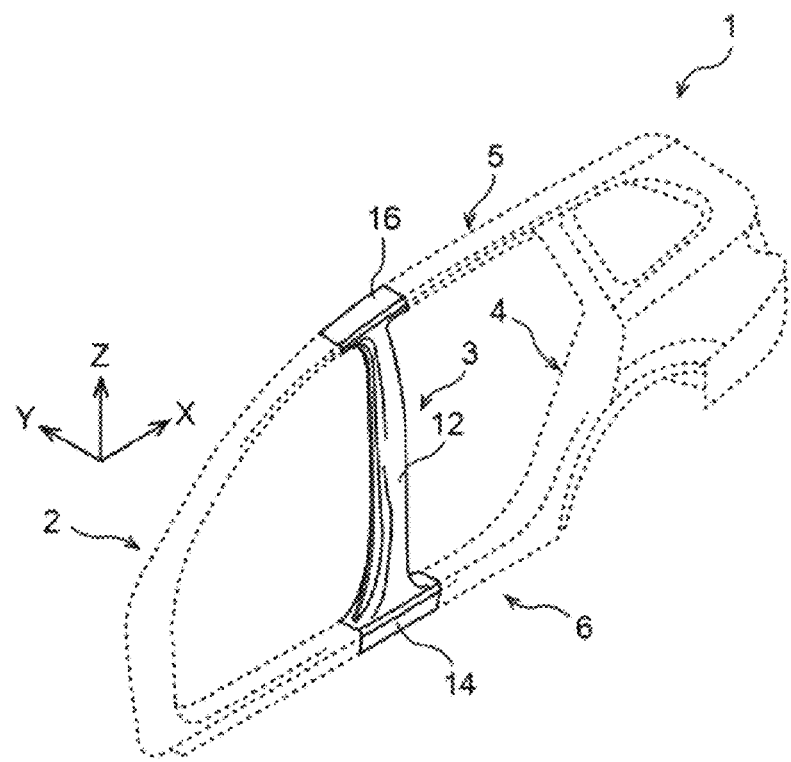
FIG. 1 is a schematic diagram illustrating an example of an appearance of a body side structure.

Upon manufacturing a fiber-reinforced resin composite material, stacking fiber-reinforced resin sheets for a surface or for each of multiple surfaces and curing a fiber-reinforced resin thereafter lead to formation of, at a ridge, a noncontinuous part in a stack made of the fiber-reinforced resin. The ridge is a corner serving as a boundary between surfaces. The thus-formed noncontinuous part includes fibers that are discontinuous, which can cause the ridge to serve as a point of origin of a breakage if a load is applied to the fiber-reinforced resin composite material.

It is desirable to provide a fiber-reinforced resin composite material and a method of manufacturing the fiber-reinforced resin composite material that are able to suppress a reduction in strength of a ridge in the fiber-reinforced resin composite material having a stack of a plurality of fiber-reinforced resin sheets.

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

[Fiber-Reinforced Resin Composite Material]

Figure 2:
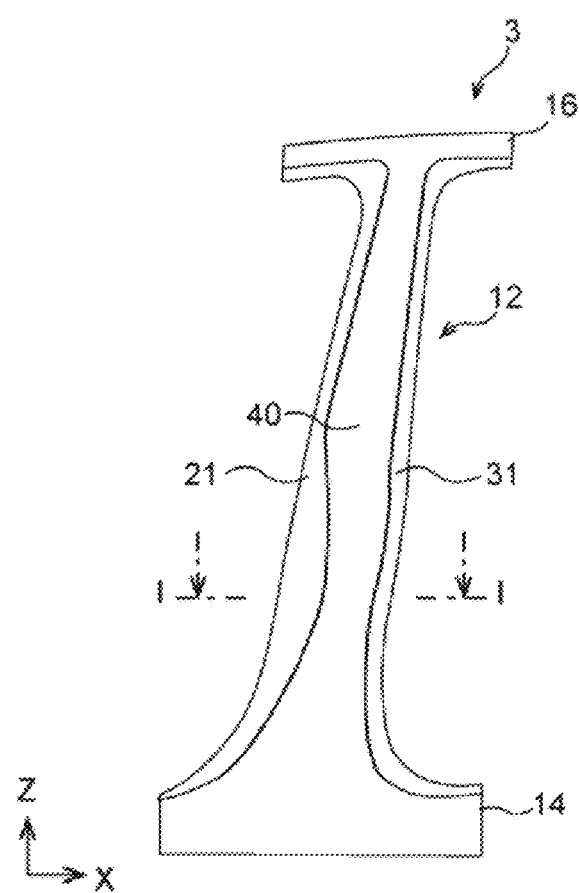
FIG. 2 is a schematic diagram illustrating, as viewed in a Y direction, a center pillar that uses a fiber-reinforced resin composite material according to one example embodiment of the technology.

A description is given hereinafter of a center pillar that uses a fiber-reinforced resin composite material according to an example embodiment of the technology. FIGS. 1 and 2 each illustrate an overall configuration of a center pillar 3. FIG. 1 schematically illustrates an example of an appearance of a body side structure 1. The body side structure 1 of FIG. 1 is schematically illustrated as a part of a structure positioned on a left side of a vehicle. FIG. 2 illustrates the center pillar 3 as seen in a vehicle width direction from an outer side of the vehicle. As used herein, the vehicle width direction, a front-rear direction of the vehicle (i.e., a vehicle length direction), and a vehicle height direction may sometimes be respectively described as a Y direction, an X direction, and a Z direction as illustrated in FIGS. 1 and 2.

The body side structure 1 may include, without limitation, a roof side rail 5, a rear pillar 4, a front pillar 2, the center pillar 3, and a side sill 6. The roof side rail 5 may extend, in the X direction, above a vehicle interior space of the vehicle, and may form a side part of a roof of the vehicle. The side sill 6 may extend, in the X direction, below a side of the vehicle.

The front pillar 2 may have a lower end coupled to a front end of the side sill 6, and may have an upper end coupled to a front end of the roof side rail 5. The front pillar 2 may be so disposed as to form a front part structuring the vehicle interior space of the vehicle and as to support a side of a windshield. The rear pillar 4 may have a lower end coupled to a rear end of the side sill 6, and may have an upper end coupled to a rear end of the roof side rail 5. The center pillar 3 may have a lower end coupled to a middle part of the side sill 6 positioned in the middle, in the X direction, of the side sill 6. The center pillar 3 may also have an upper end coupled to a middle part of the roof side rail 5 positioned in the middle, in the X direction, of the roof side rail 5.

The side sill 6, the roof side rail 5, the front pillar 2, and the center pillar 3 may form an opening for a front door. The side sill 6, the roof side rail 5, the rear pillar 4, and the center pillar 3 may form an opening for a rear door.

The center pillar 3 of the thus-configured body side structure 1 has a longitudinal direction that follows along the Z direction, and may have a substantially tube shape. The center pillar 3 may include: a roof side rail connection 16 provided at the upper end of the center pillar 3; a side sill connection 14 provided at the lower end of the center pillar 3; and a pillar body 12 positioned between the roof side rail connection 16 and the side sill connection 14. In an example embodiment, the center pillar 3 may be formed by a fiber-reinforced resin.

The roof side rail connection 16 and the side sill connection 14 of the center pillar 3 each may have a substantially tube shape whose axial direction is along the X direction. The pillar body 12 may have a substantially tube shape whose axial direction is along the Z direction. The roof side rail connection 16 and the side sill connection 14 each may have a hollow tube shape or a solid tube shape. The pillar body 12 may include a tube part 40 and flanges 21 and 31. The tube part 40 may include the fiber-reinforced resin composite material according to an example embodiment of the technology. The flanges 21 and 31 may be provided on both sides, in the X direction, of the tube part 40. The flanges 21 and 31 may be joined to respective side surfaces of the tube part 40 by an adhesive, for example. The flanges 21 and 31 may respectively serve as a doorstop of the front door and a doorstop of the rear door, for example. At least the tube part 40 may include a composite material having the fiber-reinforced resin. The fiber-reinforced resin may include reinforcing fibers impregnated with a thermoplastic resin or a thermosetting resin. At least the tube part 40 may include the composite material, achieving a higher strength and a lighter weight.

Figure 3:
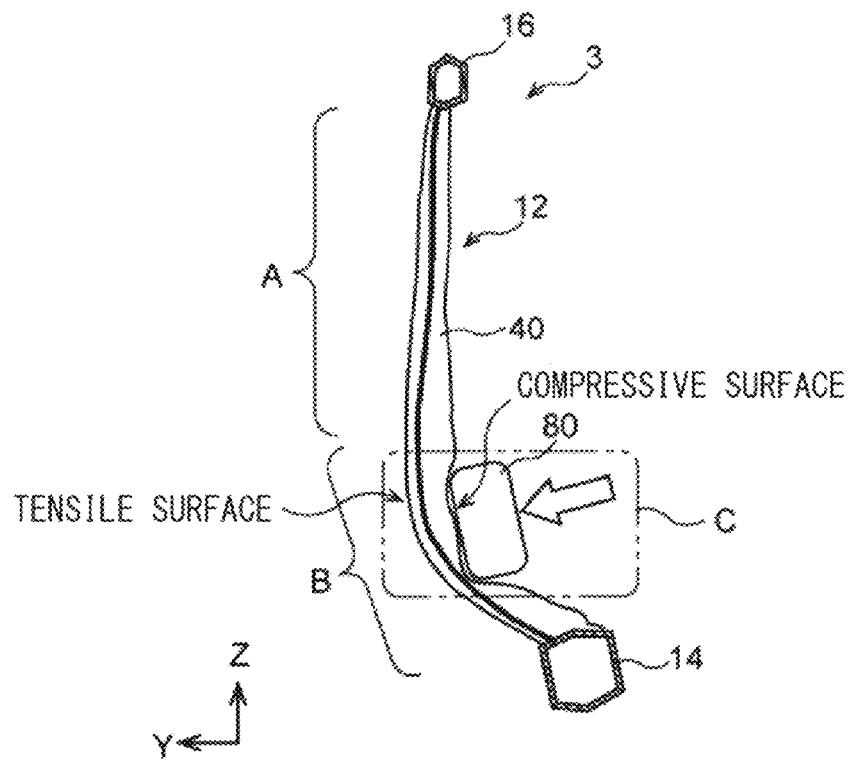
FIG. 3 is an explanatory diagram illustrating an example of a state of the center pillar upon a side collision of a vehicle.

FIG. 3 describes an example of a state of the center pillar 3 upon a side collision of the vehicle. Referring to FIG. 3, the center pillar 3 may include a region (hereinafter may be referred to as a "first region") A that is positioned at an upper part of the pillar body 12 and that is positioned at least above a side collision assumed region C. The side collision assumed region C may correspond to a height of a bumper of the vehicle. The center pillar 3 may also include a region (hereinafter may be referred to as a "second region") B that is positioned at a lower part of the pillar body 12 and that includes the side collision assumed region C. The first region A may be configured to less deform as compared with the second region B and may serve to protect a head of an occupant upon the side collision. The second region B may be configured to deform more easily as compared with the first region A and may serve to absorb a collision load to be applied upon the side collision.

When the collision load is applied to the pillar body 12 upon the side collision of the vehicle, a side surface of the pillar body 12 positioned on a vehicle interior side (i.e., on an inner side) may serve as a tensile surface in which a tensile stress that acts in the Z direction is mainly generated, whereas a side surface of the pillar body 12 positioned outside of the vehicle (i.e., on an outer side) may serve as a compressive surface in which a compressive stress that acts in the Z direction is mainly generated. In addition, two side surfaces that couple the side surface on the inner side and the side surface on the outer side involve both a tensile field and a compressive field upon the application of the collision load. Accordingly, the center pillar 3 according to an example embodiment may include the pillar body 12 having: the side surface that is positioned on the outer side and that has an increased strength mainly against the compressive stress; and the side surface that is positioned on the inner side and that has an increased strength mainly against the tensile stress.

Figure 4:
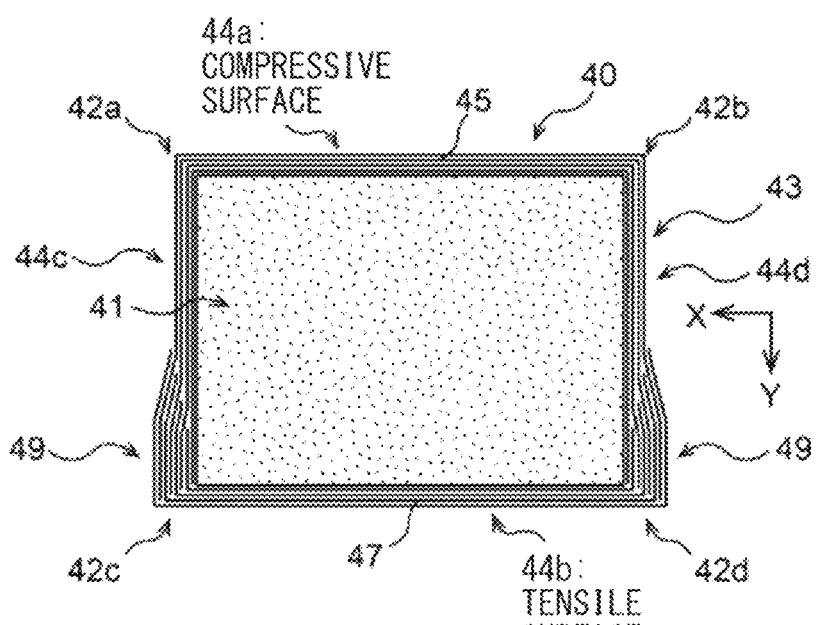
FIG. 4 is a cross-sectional view of an example configuration of a tube part of the center pillar.
Figure 5:
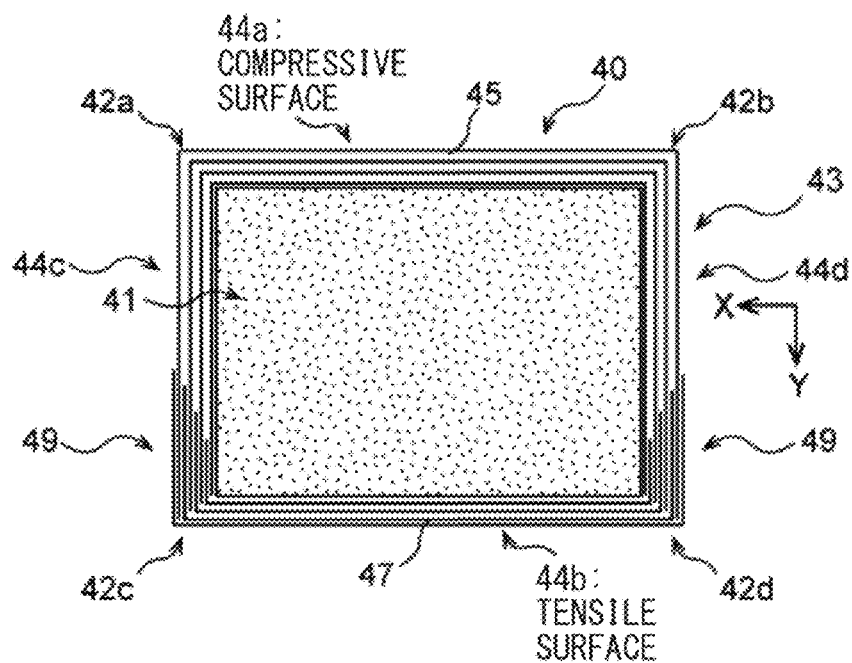
FIG. 5 is a schematic diagram illustrating an example of a configuration of the tube part of the center pillar.

FIGS. 4 and 5 each illustrate a cross section of the tube part 40 of the pillar body 12 at a position indicated by line I-I in FIG. 2 and as seen from an arrow direction in FIG. 2. In other words, FIGS. 4 and 5 each illustrate a cross section of the second region B of the pillar body 12, in which FIG. 4 illustrates the cross section of the tube part 40 and FIG. 5 schematically illustrates a configuration of the tube part 40 for easier understanding of a stack structure of the tube part 40.

The tube part 40 may include a core 41 and a fiber-reinforced resin layer 43 provided around the core 41. For example, the core 41 may be provided to increase a strength of the tube part 40 or to allow for easier molding of the tube part 40, although a role of the core 41 is not particularly limited. The core 41 may include a material such as a resin, metal, a porous material, a honeycomb structural body, or wood. In some embodiments, the center pillar 3 may not include the core 41.

The fiber-reinforced resin layer 43 may be provided throughout the entire circumference of the core 41. Accordingly, the tube part 40 may have a closed cross-sectional structure. The fiber-reinforced resin layer 43 may include a cured and molded stack of fiber-reinforced resin sheets each including continuous fibers. The fiber-reinforced resin sheet may include the continuous fibers that are impregnated with a matrix resin. The fiber-reinforced resin layer 43 may include short fibers in addition to the continuous fibers. Non-limiting examples of the usable continuous fibers may include carbon fibers. In an alternative example, the continuous fiber may be any fiber other than the carbon fiber, or may be a combination of multiple fibers. Advantageously, in one example, the reinforcing fibers may include the carbon fibers in consideration of their superior mechanical characteristics.

The matrix resin in the fiber-reinforced resin sheet may be a thermoplastic resin or a thermosetting resin. Non-limiting examples of the thermoplastic resin may include a polyethylene resin, a polypropylene resin, a polyvinyl chloride resin, an ABS resin (an acrylonitrile-butadiene-styrene copolymerized resin), a polystyrene resin, an AS resin (an acrylonitrile-styrene copolymerized resin), a polyamide resin, a polyacetal resin, a polycarbonate resin, a polyester resin, a PPS (polyphenylene sulfide) resin, a fluororesin, a polyetherimide resin, a polyetherketone resin, and a polyimide resin.

The matrix resin may be any thermoplastic resin, such as one of the thermoplastic resins described above, or a mixture of thermoplastic resins including, without limitation, the thermoplastic resins described above. In an alternative example, the matrix resin may be a copolymer of thermoplastic resins including, without limitation, the thermoplastic resins described above. A compatibilizing agent may be used in combination in an example where a mixture of the thermoplastic resins is used. The thermoplastic resin may be further added with a flame retardant such as a bromine-based flame retardant, a silicone-based flame retardant, or red phosphorus.

Non-limiting examples of the thermosetting resin may include an epoxy resin, an unsaturated polyester resin, a vinylester resin, a phenolic resin, a polyurethane resin, and a silicone resin. The matrix resin may be any thermosetting resin, such as one of the thermosetting resins described above, or a mixture of thermosetting resins including, without limitation, the thermosetting resins described above. The thermosetting resin or the thermosetting resins may be added with any curing agent or any reaction accelerator in an example where one or more thermosetting resins are used.

The fiber-reinforced resin layer 43 may have a side surface that is positioned on the outer side and that includes a first stack 45. The first stack 45 includes a plurality of fiber-reinforced resin sheets. The plurality of fiber-reinforced resin sheets may include a unidirectional member in which fibers are impregnated with a resin. The fibers of the unidirectional member may be disposed at least in the Z direction that substantially follows along a longitudinal direction of the pillar body 12. The fiber-reinforced resin layer 43 may have a side surface that is positioned on the inner side and that includes a second stack 47. The second stack 47 includes a plurality of fiber-reinforced resin sheets. The plurality of fiber-reinforced resin sheets may include a cross member in which fibers are impregnated with the resin. The fibers of the cross member may be oriented at least in multiple directions that intersect with each other.

Figure 6:
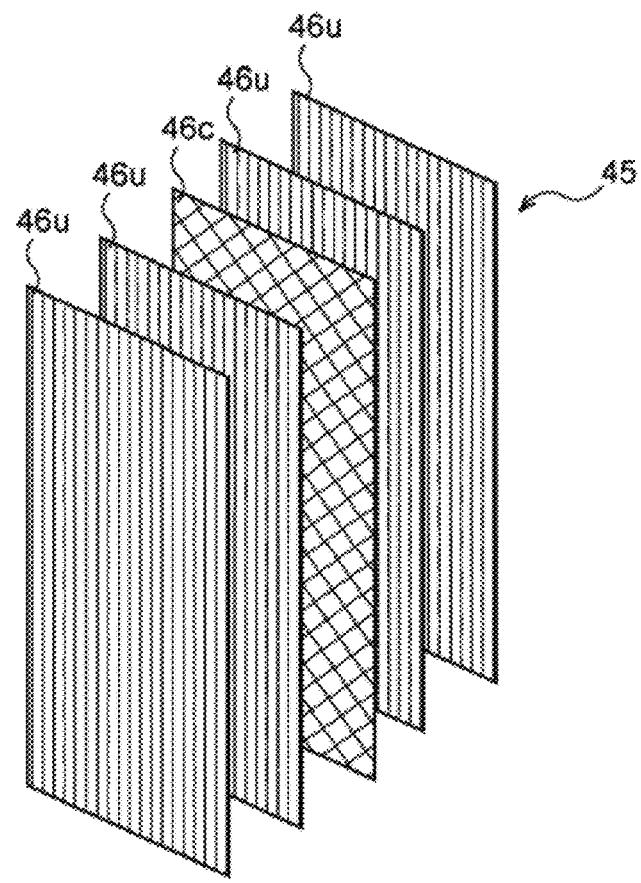
FIG. 6 is an explanatory diagram illustrating an example of a configuration of a first stack.

Referring to FIG. 6, the first stack 45 may include the plurality of fiber-reinforced resin sheets that mainly includes the unidirectional members 46u. The unidirectional member 46u may include continuous fibers that are disposed in the Z direction and that are impregnated with the matrix resin. FIG. 6 illustrates an example in which the first stack 45 includes four unidirectional members 46u and one cross member 46c. The cross member 46c may include continuous fibers that are respectively disposed in, for example, a direction of plus 45 degrees and a direction of minus 45 degrees relative to the Z direction as an orientation direction of the continuous fibers included in the unidirectional member 46u. Such a configuration that mainly uses the unidirectional members 46u for the outer-side side surface, which serves as the compressive surface upon the application of the collision load, helps to increase the strength against the compressive stress.

Note that the configuration illustrated in FIG. 6 is exemplary, and a configuration ratio between the unidirectional member 46u and the cross member 46c may be varied on an as-necessary basis as long as the unidirectional member 46u is higher in configuration ratio than the cross member 46c. Further, in some embodiments, the first stack 45 may include, in addition to the unidirectional member 46u having the continuous fibers that are disposed in the Z direction, a unidirectional member having continuous fibers that are disposed in any direction.

Figure 7:
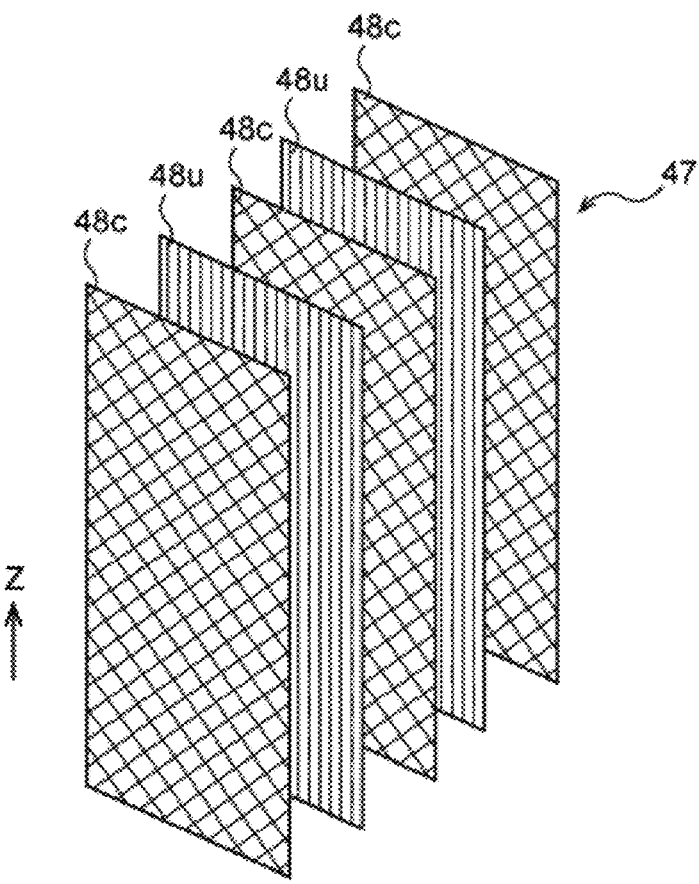
FIG. 7 is an explanatory diagram illustrating an example of a configuration of a second stack.

Referring to FIG. 7, the second stack 47 may include the plurality of fiber-reinforced resin sheets that mainly includes the cross members 48c. The cross member 48c may include continuous fibers that are disposed in multiple directions intersecting with each other and that are impregnated with the matrix resin. FIG. 7 illustrates an example in which the second stack 47 includes three cross members 48c and two unidirectional members 48u. Such a configuration that mainly uses the cross members 48c for the inner-side side surface, which serves as the tensile surface upon the application of the collision load, helps to increase the strength against the tensile stress.

Note that the configuration illustrated in FIG. 7 is exemplary, and a configuration ratio between the cross member 48c and the unidirectional member 48u may be varied on an as-necessary basis as long as the cross member 48c is higher in configuration ratio than the unidirectional member 48u. Further, in some embodiments, the unidirectional member 48u may have continuous fibers that are oriented in the Z direction or oriented in any direction other than the Z direction.

Referring back to FIGS. 4 and 5, the tube part 40 may have the cross section having a substantially rectangular shape, and may have four ridges 42a to 42d and four flat surfaces 44a to 44d. The ridges 42a to 42d each extend in the longitudinal direction. The flat surfaces 44a to 44d are continuous to the ridges 42a to 42d. Note that the flat surfaces 44a to 44d encompass not only the completely flat surfaces but also slightly bent surfaces and slightly curved surfaces. It is to be also noted that the ridges 42a to 42d are collectively referred to as ridges 42 unless otherwise required to distinguish them from one another.

The first stack 45 and the second stack 47 structuring the fiber-reinforced resin layer 43 are joined to each other in a circumferential direction that intersects the longitudinal direction of the tube part 40. The tube part 40 includes a connection 49 at which the first stack 45 and the second stack 47 are coupled to each other. The connection 49 is provided on each of the flat surfaces 44c and 44d excluding the ridges 42, and includes an alternate overlap of the fiber-reinforced resin sheets of the respective first stack 45 and second stack 47. Further, the connection 49 includes ends of the respective fiber-reinforced resin sheets of the first stack 45, the second stack 47, or both. The ends of the fiber-reinforced resin sheets are shifted from each other to allow the connection 49 to have a thickness that is gradually varied.

In an example embodiment, the first stack 45 structuring the flat surface 44a that serves as the compressive surface may extend from the flat surface 44a to each of the flat surfaces 44c and 44d that involve both the compressive field and the tensile field. The second stack 47 structuring the flat surface 44b that serves as the tensile surface may extend from the flat surface 44b to each of the flat surfaces 44c and 44d that involve both the compressive field and the tensile field. The first stack 45 and the second stack 47 may be coupled to each other at each of the flat surfaces 44c and 44d. The first stack 45 and the second stack 47 are so coupled to each other that the fiber-reinforced resin sheets of the respective first stack 45 and second stack 47 are overlapped alternately with each other, allowing continuity to be established between the first stack 45 and the second stack 47 and thereby helps to prevent the connection 49 from serving as a point of origin of a breakage upon the application of the collision load.

Figure 8:
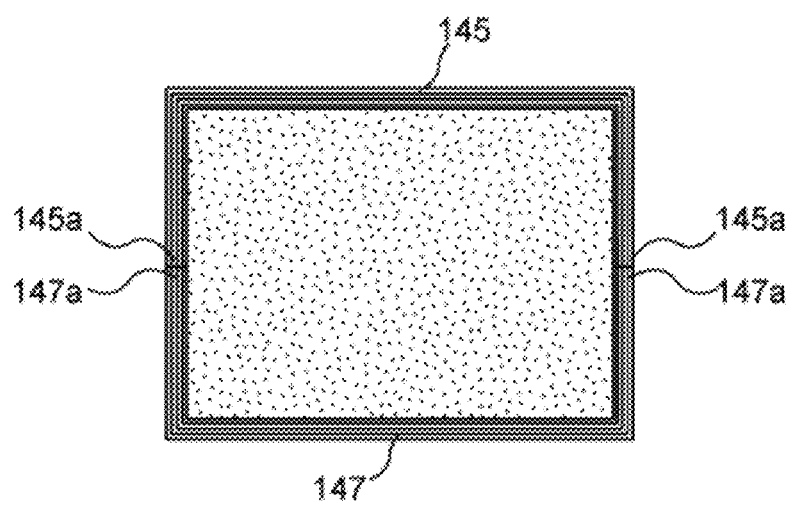
FIG. 8 is an explanatory diagram illustrating a tube part according to a reference example.
Figure 9:
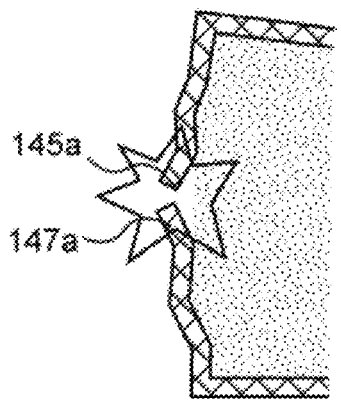
FIG. 9 is an explanatory diagram illustrating a state in which the tube part according to the reference example is broken.

For example, according to a reference example illustrated in FIG. 8, a first stack 145 and a second stack 147 are so coupled to each other as to cause their respective ends 145a and 147a to come face-to-face with each other without making fiber-reinforced resin sheets of the respective first stack 145 and second stack 147 overlap with each other. Coupling the first stack 145 and the second stack 147 simply by causing their respective ends 145a and 147a to come face-to-face with each other results in less continuity between the first stack 145 and the second stack 147, and thus can easily cause a part at which the first stack 145 and the second stack 147 are coupled to each other to serve as the point of origin of the breakage upon the application of the collision load as illustrated in FIG. 9. In contrast, alternately overlapping the fiber-reinforced resin sheets of the respective first stack 45 and second stack 47 helps to prevent the connection 49 from serving as the point of origin of the breakage even when a stress has acted on the connection 49.

No particular limitation is imposed on a position of the connection 49 on at least one of the flat surfaces 44a to 44d that are continuous to the ridges 42. The connection 49 is a part at which the first stack 45 and the second stack 47 are coupled to each other. In some embodiments, the connection 49 may be provided on the flat surface 44a that serves as the tensile surface or the flat surface 44b that serves as the compressive surface. In an example embodiment, the connection 49 may be provided on each of the flat surfaces 44c and 44d that join the tensile surface and the compressive surface together, in order to increase strength against the compressive stress to be applied to the compressive surface positioned on the outer side and to increase strength against the tensile stress to be applied to the tensile surface positioned on the inner side. In addition, the flat surfaces 44c and 44d each involve a mixture of both the compressive field and the tensile field upon the application of the collision load. Accordingly, extending the first stack 45 and the second stack 47 to each of the flat surfaces 44c and 44d and coupling the first stack 45 and the second stack 47 at each of the flat surfaces 44c and 44d make it possible to achieve strength against each of the tensile stress and the compressive stress that act on the flat surfaces 44c and 44d.

Further, providing the connection 49 at which the first stack 45 and the second stack 47 are coupled to each other on at least one of the flat surfaces 44a to 44d other than the ridges 42 makes it possible to structure the ridges 42 in a continuous fashion by the single stack. The ridge 42 is a part at which a stress tends to be concentrated upon the application of the collision load. This configuration helps to prevent the connection 49 from serving as the point of origin of the breakage due to the stress that acts on the ridges 42.

Moreover, providing the connection 49 at which the first stack 45 and the second stack 47 are coupled to each other on at least one of the flat surfaces 44a to 44d other than the ridges 42 allows the continuous fibers included in the first stack 45 or the second stack 47 to so stride across the ridges 42 as to intersect the ridges 42 at those ridges 42. Thus, the ridges 42 are reinforced by the continuous fibers, which helps to prevent the ridges 42 from serving as points of origin of breakage when a stress has acted on the ridges 42 upon the application of the collision load.

Additionally, shifting the ends of the fiber-reinforced resin sheets structuring the first stack 45, the second stack 47, or both to thereby gradually vary the thickness of the connection 49 prevents a sharp change in a thickness of the fiber-reinforced resin layer 43. This configuration helps to prevent the connection 49 from serving as the point of origin of the breakage due to concentration of a stress at the connection 49 upon the application of the collision load.

Figure 10:
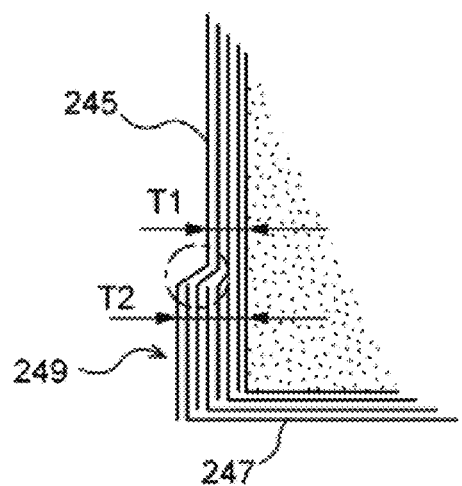
FIG. 10 is an explanatory diagram illustrating a tube part according to another reference example.

FIG. 10 illustrates another reference example in which ends of respective fiber-reinforced resin sheets are overlapped with each other without shifting positions of their respective ends. In the reference example illustrated in FIG. 10, fiber-reinforced resin sheets structuring a second stack 247 are overlaid alternately on fiber-reinforced resin sheets structuring a first stack 245 without shifting positions of ends of the fiber-reinforced resin sheets structuring the second stack 247. Accordingly, a thickness sharply changes from a region of the first stack 245 having a thickness T1 to a region of a connection 249 having a thickness T2. The connection 249 is where the first stack 245 and the second stack 247 are coupled to each other. Such a configuration allows a stress to be concentrated at a step where the thickness sharply changes and thus can easily cause the connection 249 to serve as a point of origin of breakage upon the application of the collision load.

In contrast, in an example embodiment, the positions of the respective ends of the fiber-reinforced resin sheets included in the second stack 47 that structures the tensile surface may be so shifted as to be closer to the compressive surface as the positions are closer to a surface layer as illustrated in FIG. 5. This configuration allows the thickness of the connection 49 of the fiber-reinforced resin layer 43 following the molding to be gradually changed and thus prevents the sharp change in the thickness as illustrated in FIG. 4. Such a configuration in turn reduces the concentration of the stress at the step upon the application of the collision load.

If a shifting amount of the ends of the fiber-reinforced resin sheets structuring the first stack 45, the second stack 47, or both is too small, the change in the thickness of the step provided at the connection 49 becomes relatively sharp, which can lead to an increase in the stress to be applied to the step upon the application of the collision load. If the shifting amount is too large, the change in the thickness of the step becomes moderate; on the other hand, an amount of the fiber-reinforced resin sheets used increases, which can affect a weight reduction. Accordingly, the shifting amount may be set to fall within an appropriate range in view of some reasons described above.

Further, in an example embodiment, the ends of the fiber-reinforced resin sheets structuring the first stack 45 may be disposed in the vicinity of the ridges 42 in the tube part 40 of the center pillar 3. For example, the ends of the fiber-reinforced resin sheets structuring the first stack 45 may be provided at a bending position of the fiber-reinforced resin sheets structuring the second stack 47. This configuration suppresses formation of a sharp step on a surface of the fiber-reinforced resin layer 43 without largely shifting the positions of the respective ends of the fiber-reinforced resin sheets structuring the first stack 45. In an alternative example, the positions of the respective ends of the fiber-reinforced resin sheets structuring the first stack 45 may be shifted to suppress the sharp change in the thickness of the fiber-reinforced resin layer 43. Note that causing the ends of the respective fiber-reinforced resin sheets structuring the first stack 45 to be positioned at the bending position of the fiber-reinforced resin sheets structuring the second stack 47 allows the ends of the fiber-reinforced resin sheets structuring the first stack 45 to be disposed on the basis of the ridges 42 without largely shifting the positions of the respective ends of the fiber-reinforced resin sheets structuring the first stack 45, which in turn allows for easier manufacturing steps.

As described above, the center pillar 3 may include the tube part 40 that includes the fiber-reinforced resin composite material according to an example embodiment. The center pillar 3 includes the first stack 45 having a desired strength against the compressive stress and the second stack 47 having a desired strength against the tensile stress. The first stack 45 and the second stack 47 are so coupled to each other that the fiber-reinforced resin sheets of the respective first stack 45 and second stack 47 are overlapped alternately at one or more of the flat surfaces 44a to 44d excluding the ridges 42. This configuration makes it possible to establish the continuity between the first stack 45 and the second stack 47 and helps to prevent the ridges 42 from serving as the points of origin of the breakage due to a stress that acts on the ridges 42 upon the application of the collision load. In addition, the ends of the fiber-reinforced resin sheets structuring the first stack 45, the second stack 47, or both are shifted from each other. This configuration suppresses the formation, at the connection 49 at which the first stack 45 and the second stack 47 are coupled to each other, of the step that involves the sharp change in the thickness and thereby makes it possible to suppress the concentration of the stress at the connection 49 upon the application of the collision load.

[Method of Manufacturing Fiber-Reinforced Resin Composite Material]

A description is given next of an example of a method of manufacturing the tube part 40 that includes the fiber-reinforced resin composite material according to an example embodiment.

Figure 11:
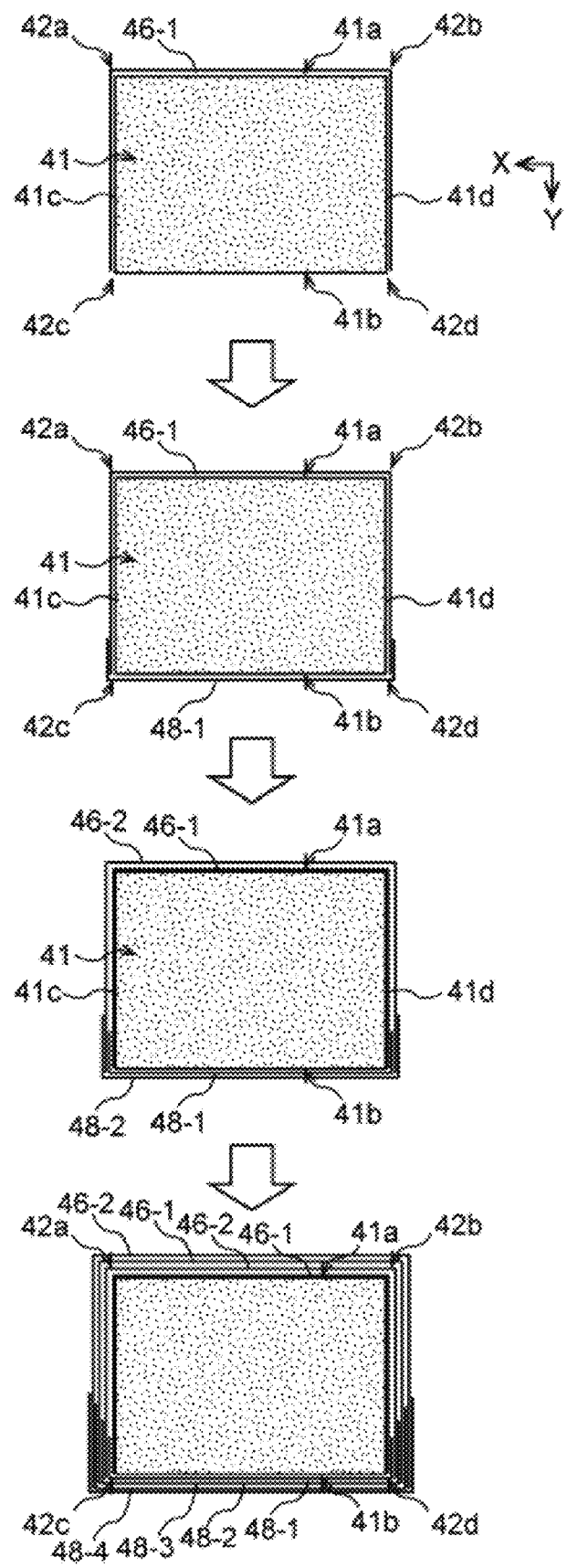
FIG. 11 is an explanatory diagram illustrating an example of a method of manufacturing the tube part as one example of the fiber-reinforced resin composite material according to one example embodiment.
Figure 12:
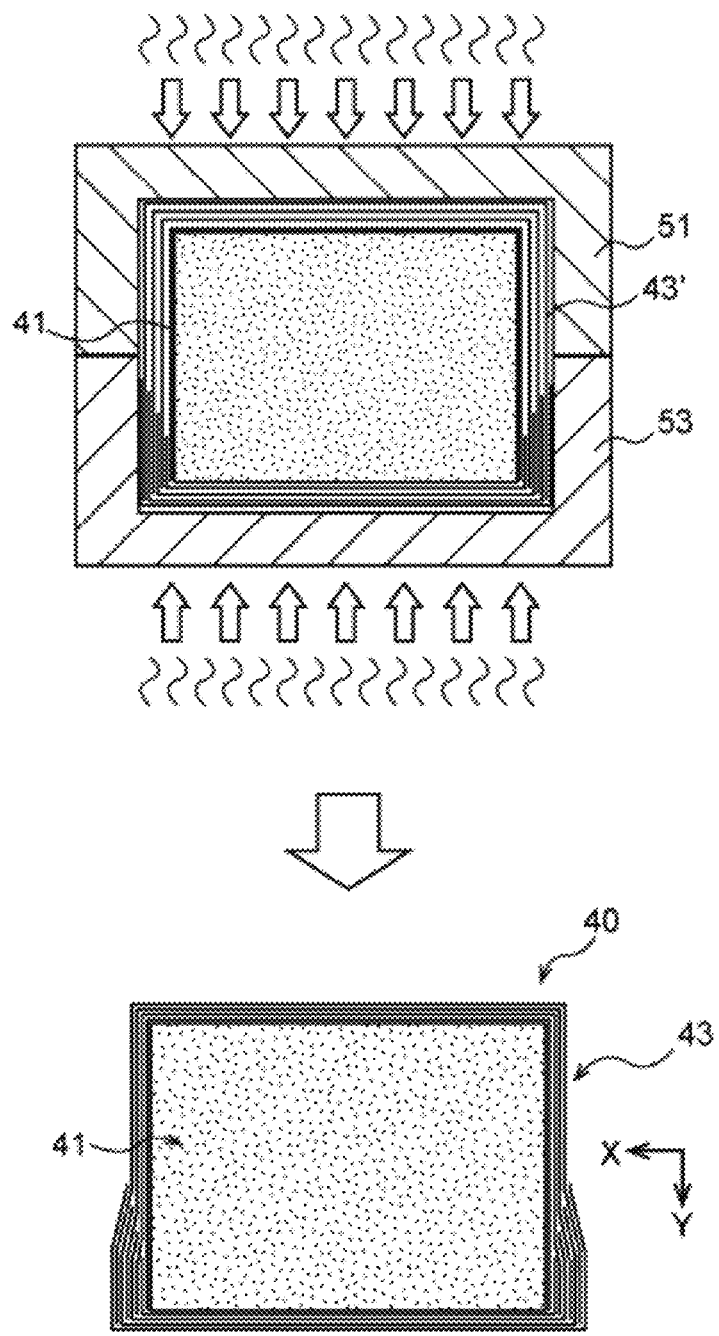
FIG. 12 is an explanatory diagram illustrating an example of forming a fiber-reinforced resin layer by hot-press molding.

FIGS. 11 and 12 each describe a method of manufacturing the tube part 40. The method of manufacturing the tube part 40 includes stacking the fiber-reinforced resin sheets around the core 41 and curing the fiber-reinforced resin sheets. Note that FIGS. 11 and 12 each illustrate, in association with the cross-sectional view illustrated in FIG. 4, the tube part 40 to be manufactured.

Referring to FIG. 11, a fiber-reinforced resin sheet 46-1 may be disposed on a surface 41a of the core 41. The surface 41a may eventually serve as the compressive surface of the tube part 40 to be manufactured. The fiber-reinforced resin sheet 46-1 may be disposed not only on the surface 41a that eventually serves as the compressive surface but also to stride over the ridges 42a and 42b and extend up to both side surfaces 41c and 41d. The both side surfaces 41c and 41d each may join the surface 41a that eventually serves as the compressive surface and a surface 41b that eventually serves as the tensile surface.

Thereafter, a fiber-reinforced resin sheet 48-1 may be disposed on the surface 41b that eventually serves as the tensile surface. The fiber-reinforced resin sheet 48-1 may be disposed not only on the surface 41b that eventually serves as the tensile surface but also to stride over the ridges 42c and 42d and extend up to the both side surfaces 41c and 41d. The fiber-reinforced resin sheet 48-1 may be so disposed that ends of the fiber-reinforced resin sheet 48-1 are overlaid on respective ends of the fiber-reinforced resin sheet 46-1 at the both side surfaces 41c and 41d.

Thereafter, a fiber-reinforced resin sheet 46-2 may be stacked on the surface 41a that eventually serves as the compressive surface. The fiber-reinforced resin sheet 46-2 may be so disposed that ends of the fiber-reinforced resin sheet 46-2 are overlaid on the respective ends of the fiber-reinforced resin sheet 48-1 at the both side surfaces 41c and 41d. Thereafter, a fiber-reinforced resin sheet 48-2 may be stacked on the surface 41b that eventually serves as the tensile surface. The fiber-reinforced resin sheet 48-2 may be so disposed that ends of the fiber-reinforced resin sheet 48-2 are overlaid on the respective ends of the fiber-reinforced resin sheet 46-2 at the both side surfaces 41c and 41d. In addition, the ends of the fiber-reinforced resin sheet 48-2 may be so disposed as to be shifted more toward the surface 41a that eventually serves as the compressive surface than the respective ends of the fiber-reinforced resin sheet 48-1.

Thereafter, a plurality of fiber-reinforced resin sheets 46-3 and 46-4 and a plurality of fiber-reinforced resin sheets 48-3 and 48-4 may be so stacked, at positions excluding the ridges 42, as to be overlapped alternately and as to cause the ends of at least the fiber-reinforced resin sheets 48-1 to 48-4 eventually structuring the second stack 47 to be shifted from each other. The plurality of fiber-reinforced resin sheets 46-3 and 46-4 may be formed on the surface 41a that eventually serves as the compressive surface and may eventually structure the first stack 45. The plurality of fiber-reinforced resin sheets 48-3 and 48-4 may be formed on the surface 41b that eventually serves as the tensile surface and may eventually structure the second stack 47.

The plurality of fiber-reinforced resin sheets 46-1 to 46-4 that eventually structures the first stack 45 may mainly include the unidirectional members 46u each including the continuous fibers that are disposed in the longitudinal direction of the tube part 40. The plurality of fiber-reinforced resin sheets 48-1 to 48-4 that eventually structures the second stack 47 may mainly include the cross members 48c each including the continuous fibers that are disposed in the multiple directions. For example, the cross member 46c may include the continuous fibers that are respectively disposed in the direction of plus 45 degrees and the direction of minus 45 degrees relative to the longitudinal direction of the tube part 40.

In some embodiments, the plurality of fiber-reinforced resin sheets 46-1 to 46-4 that eventually structures the first stack 45 and the plurality of fiber-reinforced resin sheets 48-1 to 48-4 that eventually structures the second stack 47 may be stacked alternately on a one-by-one basis. In some embodiments, any collective combination of the fiber-reinforced resin sheets 46-1 to 46-4 and any collective combination of the fiber-reinforced resin sheets 48-1 to 48-4 may be stacked alternately. Note that alternately stacking the plurality of fiber-reinforced resin sheets 46-1 to 46-4 and the plurality of fiber-reinforced resin sheets 48-1 to 48-4 on the one-by-one basis makes it difficult to form a step on an outermost surface of the tube part 40.

Thereafter, referring to FIG. 12, the core 41 around which a fiber-reinforced resin stack 43' is thus stacked may be placed in molding dies 51 and 53. The core 41 having the fiber-reinforced resin stack 43' may be heated under pressure to form, by means of die molding, the tube part 40 as the fiber-reinforced resin composite material. For example, hot-press molding may be employed upon forming the fiber-reinforced resin layer 43 with use of the fiber-reinforced resin sheets having the thermosetting resin and the continuous fibers. FIG. 12 illustrates an example in which the fiber-reinforced resin layer 43 is formed with use the fiber-reinforced resin sheets having the thermosetting resin as the matrix resin and by means of the hot-press molding.

Figure 13:
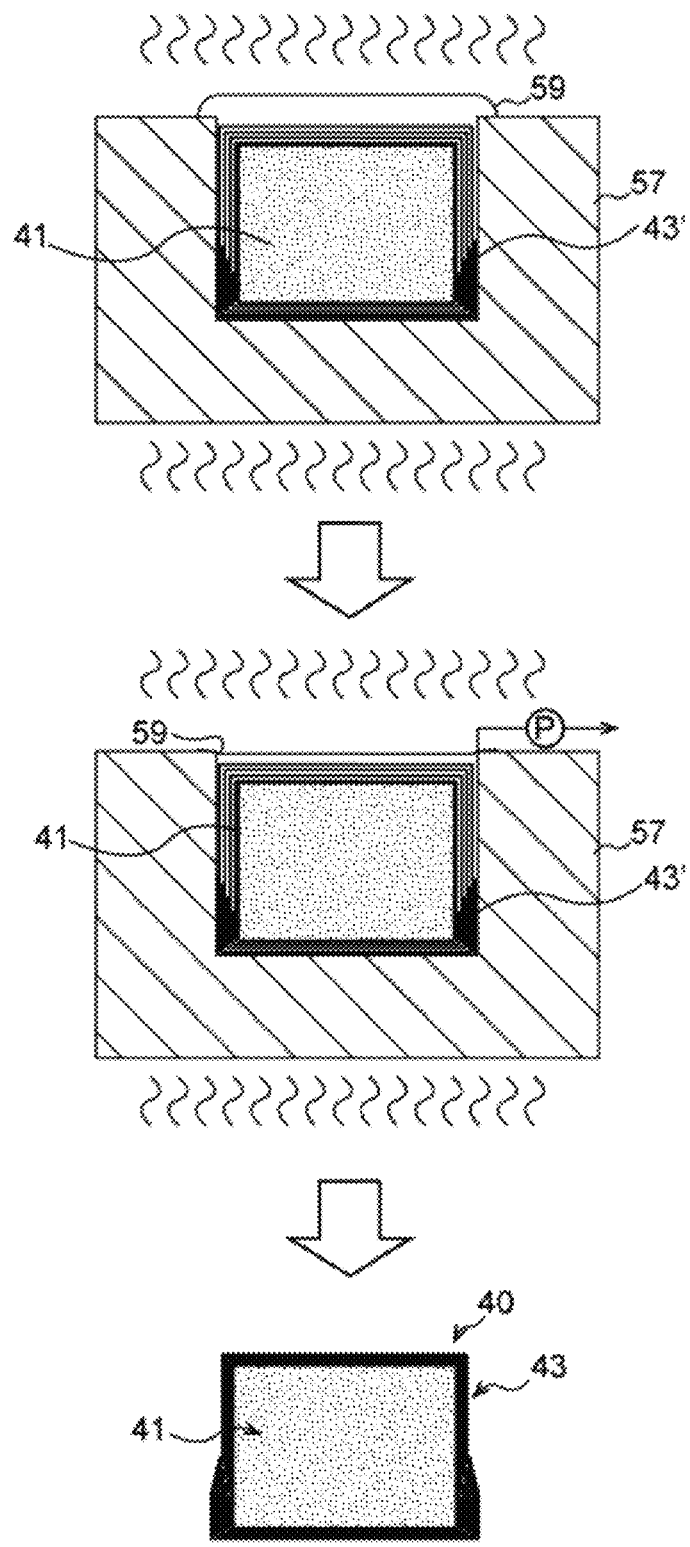
FIG. 13 is an explanatory diagram illustrating an example of forming the fiber-reinforced resin layer by autoclave molding.

In an alternative example, autoclave molding may be employed upon forming the fiber-reinforced resin layer 43 with use of the fiber-reinforced resin sheets having the thermosetting resin and the continuous fibers. FIG. 13 illustrates an example in which the fiber-reinforced resin layer 43 is formed with use the fiber-reinforced resin sheets having the thermosetting resin as the matrix resin and by means of the autoclave molding.

Referring to FIG. 13, the core 41 around which the fiber-reinforced resin stack 43' is thus stacked may be placed in a molding die 57 to perform bagging of the core 41, following which the core 41 having the fiber-reinforced resin stack 43' may be heated while performing vacuuming of the inside of a bag 59 in an autoclave to cure the fiber-reinforced resin stack 43'. This results in molding of the tube part 40 having a desired shape.

The fiber-reinforced resin sheets disposed around the core 41 may be cured to form the fiber-reinforced resin layer 43 as described above. Thus, it is possible to obtain the tube part 40 having the connection 49 on each of the flat surfaces 44c and 44d that are continuous to the ridges 42. The connection 49 is where the first stack 45 and the second stack 47 are coupled to each other. In the connection 49, the fiber-reinforced resin sheets of the respective first stack 45 and second stack 47 are overlapped alternately.

The fiber-reinforced resin composite material according to at least one embodiment of the technology includes the first stack 45 having the desired strength against the compressive stress and the second stack 47 having the desired strength against the tensile stress. The first stack 45 and the second stack 47 are so coupled to each other that the fiber-reinforced resin sheets of the respective first stack 45 and second stack 47 are overlapped alternately on the flat surfaces 44c and 44d that are continuous to the ridges 42. This configuration makes it possible to establish the continuity between the first stack 45 and the second stack 47 and helps to prevent the ridges 42 from serving as the points of origin of the breakage upon the application of the collision load.

In addition, in the fiber-reinforced resin composite material according to at least one embodiment of the technology, the ends of the fiber-reinforced resin sheets structuring the first stack 45, the second stack 47, or both are shifted from each other to allow the connection 49 to have a thickness that is gradually varied. This configuration helps to prevent the connection 49 from serving as the point of origin of the breakage due to concentration of a stress at the connection 49 upon the application of the collision load.

The method of manufacturing the fiber-reinforced resin composite material according to at least one embodiment of the technology includes stacking the fiber-reinforced resin sheets. The stacking the fiber-reinforced resin sheets includes: alternately overlapping the plurality of fiber-reinforced resin sheets structuring the first stack 45 and the plurality of fiber-reinforced resin sheets structuring the second stack 47 on the flat surfaces 44c and 44d that are continuous to the ridges 42; and shifting, on the flat surfaces 44c and 44d, the ends of the fiber-reinforced resin sheets of the first stack 45, the second stack 47, or both to allow the connection 49 to have a thickness that is gradually varied. Hence, the method makes it possible to manufacture the fiber-reinforced resin composite material that helps to prevent the connection 49 from serving as the point of origin of the breakage upon the application of the collision load.

Although some example embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof. Furthermore, the technology encompasses any possible combination of some or all of the various embodiments and the modifications described herein and incorporated herein.

For example, the core 41 may remain in the tube part 40 in an example embodiment described above. The technology, however, is not limited thereto. In some embodiments, the core 41 may be used only upon manufacturing of the fiber-reinforced resin composite material and the core 41 may be removed after the manufacturing of the fiber-reinforced resin composite material.

For example, only the ends of the fiber-reinforced resin sheets structuring the second stack 47 may be shifted to allow the connection 49 to have a thickness that is gradually varied in an example embodiment described above. The technology, however, is not limited thereto. In some embodiments, the ends of the fiber-reinforced resin sheets structuring the first stack 45 may be shifted. In some embodiments, the ends of the fiber-reinforced resin sheets structuring each of the first stack 45 and the second stack 47 may be shifted.

For example, application of the fiber-reinforced resin composite material, which is for a structure of a body such as a vehicle body and which has the longitudinal direction, is not limited to the center pillar. The fiber-reinforced resin composite material and the method of manufacturing the fiber-reinforced resin composite material according to at least one embodiment of the technology may be applied to any structural member.

According to at least one embodiment of the technology, it is possible to suppress a reduction in strength of a ridge in a fiber-reinforced resin composite material having a stack of a plurality of fiber-reinforced resin sheets.

The invention claimed is:

1. A fiber-reinforced resin composite material for a structure of a body and having a longitudinal direction, the fiber-reinforced resin composite material comprising:
    a first stack including a plurality of first fiber-reinforced resin sheets each having fibers and each having an end;
    a second stack including a plurality of second fiber-reinforced resin sheets each having fibers and each having an end;
    a ridge extending in the longitudinal direction;
    a flat surface that is continuous to the ridge; and
    a connection provided on the flat surface and at which the first stack and the second stack are coupled to each other, wherein
    the first stack and the second stack are joined to each other in a direction that intersects the longitudinal direction,
    the fibers of at least one of the first fiber-reinforced resin sheets, the fibers of at least one of the second fiber-reinforced resin sheets, or both intersect the ridge, and
    the connection includes the first fiber-reinforced resin sheets and the second fiber-reinforced resin sheets that are overlapped alternately and includes the ends of the first fiber-reinforced resin sheets, the ends of the second fiber-reinforced resin sheets, or both, the ends of the first fiber-reinforced resin sheets, the ends of the second fiber-reinforced resin sheets, or both being shifted from each other to allow the connection to have a thickness that is gradually varied.

2. The fiber-reinforced resin composite material according to claim 1, wherein
    the plurality of first fiber-reinforced resin sheets of the first stack includes a unidirectional member in which the fibers are impregnated with a resin, the fibers of the unidirectional member being disposed at least in a direction that substantially follows along the longitudinal direction, and
    the plurality of second fiber-reinforced resin sheets of the second stack includes a cross member in which the fibers are impregnated with the resin, the fibers of the cross member being disposed at least in multiple directions that intersect with each other.

3. The fiber-reinforced resin composite material according to claim 2, wherein
    the plurality of first fiber-reinforced resin sheets of the first stack includes a plurality of the unidirectional members and one or a plurality of the cross members, the plurality of the unidirectional members being larger in number than the one or the plurality of the cross members in the first stack, and
    the plurality of second fiber-reinforced resin sheets of the second stack includes a plurality of the cross members and one or a plurality of the unidirectional members, the one or the plurality of the unidirectional members being smaller in number than the plurality of the cross members in the second stack.

4. The fiber-reinforced resin composite material according to claim 3, wherein
    the fiber-reinforced resin composite material comprises a tube part having a closed cross section,
    the first stack comprises a compressive surface configured to mainly receive a compressive stress upon collision of the body,
    the second stack comprises a tensile surface configured to mainly receive a tensile stress upon the collision of the body, and
    the connection is provided on a side surface of the flat surface, the side surface coupling the tensile surface and the compressive surface.

5. The fiber-reinforced resin composite material according to claim 4, wherein the fibers of the second fiber-reinforced resin sheets included in the second stack intersect the ridge.

6. The fiber-reinforced resin composite material according to claim 5, wherein the ends of the first fiber-reinforced resin sheets and the ends of the second fiber-reinforced resin sheets are overlapped with each other in a region, adjacent to the ridge, of the flat surface.

7. The fiber-reinforced resin composite material according to claim 4, wherein the ends of the first fiber-reinforced resin sheets and the ends of the second fiber-reinforced resin sheets are overlapped with each other in a region, adjacent to the ridge, of the flat surface.

8. The fiber-reinforced resin composite material according to claim 3, wherein the fibers of the second fiber-reinforced resin sheets included in the second stack intersect the ridge.

9. The fiber-reinforced resin composite material according to claim 8, wherein the ends of the first fiber-reinforced resin sheets and the ends of the second fiber-reinforced resin sheets are overlapped with each other in a region, adjacent to the ridge, of the flat surface.

10. The fiber-reinforced resin composite material according to claim 3, wherein the ends of the first fiber-reinforced resin sheets and the ends of the second fiber-reinforced resin sheets are overlapped with each other in a region, adjacent to the ridge, of the flat surface.

11. The fiber-reinforced resin composite material according to claim 2, wherein
    the fiber-reinforced resin composite material comprises a tube part having a closed cross section,
    the first stack comprises a compressive surface configured to mainly receive a compressive stress upon collision of the body,
    the second stack comprises a tensile surface configured to mainly receive a tensile stress upon the collision of the body, and
    the connection is provided on a side surface of the flat surface, the side surface coupling the tensile surface and the compressive surface.

12. The fiber-reinforced resin composite material according to claim 11, wherein the fibers of the second fiber-reinforced resin sheets included in the second stack intersect the ridge.

13. The fiber-reinforced resin composite material according to claim 12, wherein the ends of the first fiber-reinforced resin sheets and the ends of the second fiber-reinforced resin sheets are overlapped with each other in a region, adjacent to the ridge, of the flat surface.

14. The fiber-reinforced resin composite material according to claim 11, wherein the ends of the first fiber-reinforced resin sheets and the ends of the second fiber-reinforced resin sheets are overlapped with each other in a region, adjacent to the ridge, of the flat surface.

15. The fiber-reinforced resin composite material according to claim 2, wherein the fibers of the second fiber-reinforced resin sheets included in the second stack intersect the ridge.

16. The fiber-reinforced resin composite material according to claim 15, wherein the ends of the first fiber-reinforced resin sheets and the ends of the second fiber-reinforced resin sheets are overlapped with each other in a region, adjacent to the ridge, of the flat surface.

17. The fiber-reinforced resin composite material according to claim 2, wherein the ends of the first fiber-reinforced resin sheets and the ends of the second fiber-reinforced resin sheets are overlapped with each other in a region, adjacent to the ridge, of the flat surface.

18. The fiber-reinforced resin composite material according to claim 2, wherein the second fiber-reinforced resin sheets are overlaid alternatively on the first fiber-reinforced resin sheets without shifting positions of ends of the second fiber-reinforced resin sheets.

19. The fiber-reinforced resin composite material according to claim 1, wherein the ends of the first fiber-reinforced resin sheets and the ends of the second fiber-reinforced resin sheets are overlapped with each other in a region, adjacent to the ridge, of the flat surface.

20. The fiber-reinforced resin composite material according to claim 1, wherein the second fiber-reinforced resin sheets are overlaid alternatively on the first fiber-reinforced resin sheets without shifting positions of ends of the second fiber-reinforced resin sheets.

21. A method of manufacturing a fiber-reinforced resin composite material that is for a structure of a body and that has a ridge extending in a longitudinal direction, the method comprising:

preparing a first stack and a second stack, the first stack including a plurality of first fiber-reinforced resin sheets each having an end, the second stack including a plurality of second fiber-reinforced resin sheets each having an end;

alternately overlapping the first fiber-reinforced resin sheets and the second fiber-reinforced resin sheets on a flat surface that is continuous to the ridge, the alternately overlapping the first fiber-reinforced resin sheets and the second fiber-reinforced resin sheets including shifting the ends of the first fiber-reinforced resin sheets, the ends of the second fiber-reinforced resin sheets, or both to allow a connection at which the first stack and the second stack are coupled to each other to have a thickness that is gradually varied; and curing the first fiber-reinforced resin sheets and the second fiber-reinforced resin sheets to join the first stack and the second stack in a direction that intersects the longitudinal direction.

\* \* \* \* \*